I. HERZOG & R. KOCH.
Closing Gas-Retorts.

No. 148,455.  Patented March 10, 1874.

Witnesses:

Inventors:
Ignatz Herzog
Richard Koch

UNITED STATES PATENT OFFICE.

IGNATZ HERZOG AND RICHARD KOCH, OF NEW YORK, N. Y.

IMPROVEMENT IN CLOSING GAS-RETORTS.

Specification forming part of Letters Patent No. 148,455, dated March 10, 1874; application filed February 12, 1874.

*To all whom it may concern:*

Be it known that we, IGNATZ HERZOG and RICHARD KOCH, both of the city, county, and State of New York, have invented a new and Improved Lid for Retorts; and we do hereby declare the following to be a full, clear, and exact description thereof, which will enable those skilled in the art to make and use the same, reference being had to the accompanying drawing forming part of this specification, in which drawing—

Figure 1:
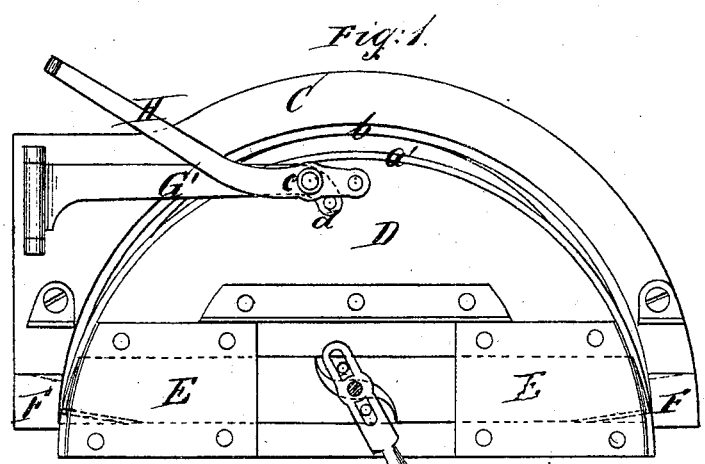
Figure 2:
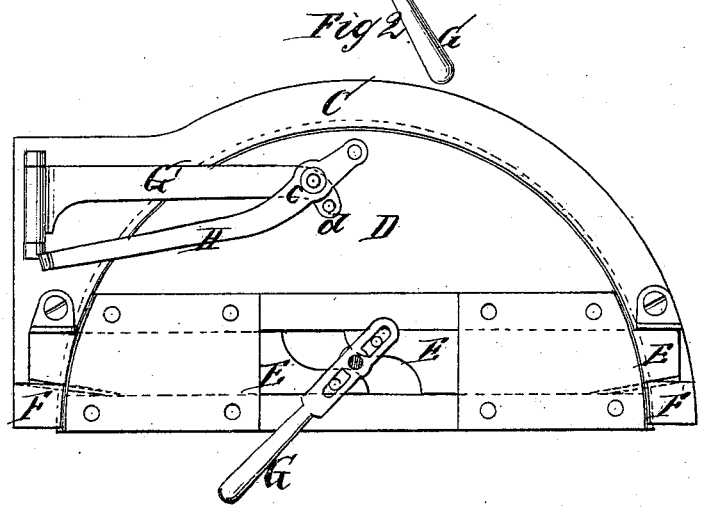
Figure 3:
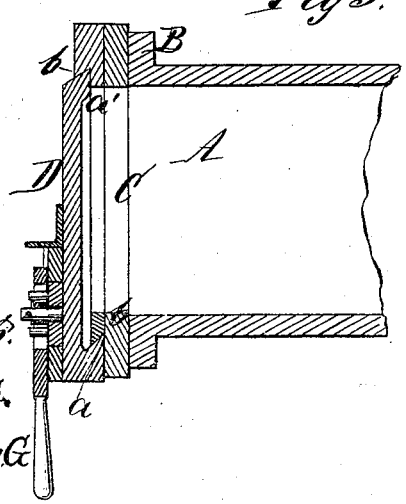

Figure 1 represents a plan or top view of this invention, the lid being unlocked. Fig. 2 is a similar view thereof when locked. Fig. 3 is a transverse section of the same.

Similar letters indicate corresponding parts.

This invention relates to a mode of securing the lid of retorts for coal-gas, &c.; and consists in the arrangement of a frame on the retort-mouth to form bearing-surfaces for the edges of the lid, which edges are V-shaped, and fit into corresponding V-shaped grooves in the rim or frame, in such a manner that, when locked, an exceedingly tight joint or connection is effected between the lid and the mouth of the retort; also, in the arrangement on the lid of bolts or wedges for locking said lid on the mouth of the retort; and, further, in the arrangement of a swivel-arm, which is pivoted to and carries the retort-lid, for the purpose of adjusting said lid in position on the mouth of the retort.

In the drawing, the letter A designates the neck or mouth piece of a retort, which is made in the usual segmental or other form, and is provided on its outer extremity with a flange, B, on which is secured a frame, C, that forms the seat of the lid D of the retort. This lid is provided on its rear end with a heel, $a$, Fig. 3, which is beveled inwardly on its inner side or edge, while the front edge or toe $a'$ of the lid is beveled outwardly, thereby forming V-shaped edges, which point in like directions on the lid. These edges are received in correspondingly-shaped grooves $b$ in the rim or frame C when the lid is slid or secured on the retort-mouth, whereby an exceedingly close joint is effected of the lid with said mouth, so as to produce an air and water tight joint, and prevent the escape of gases. The lid is locked in position by means of sliding wedges E E, which are fitted in suitable guide-grooves on the surface of the lid, and are provided with tapering sides or edges, that catch behind lugs F F on the rim or frame C. Said wedges are operated by means of a crank-arm, G, or by any other suitable means, and through the tapering sides they serve to drive home the lid on its seat. This lid, therefore, requires no locking-screw, and, at the same time, is firmly held in position on the mouth of the retort.

In order to lift up or remove the lid, it is necessary, in addition to unlocking the bolts, to bring the V-shaped edges $a\ a'$ of such lid outside or clear of their grooved bearing-surfaces $b$ on the retort-mouth. This purpose is effected through a swivel-arm, G', and a lever, H, which latter has its fulcrum in a pin, $c$, of the swivel-arm, and is pivoted at its inner end to the retort-lid. The shank of the swivel-arm is hinged on the rim or frame C of the retort-mouth, while its inner end is bent and provided with a pin, $d$, that forms a stop for the lever H.

By oscillating this lever, a backward-and-forward motion is imparted to the lid D, whereby the same is moved in and out of contact with its bearing-surfaces on the retort-mouth, and, when out of contact, the lid can be swung back off of said mouth (being supported by the swivel-arm G') with ease and facility. Said lever H also serves to press the edges of the lid home in their bearings before the locking-bolts are closed.

What we claim as new, and desire to secure by Letters Patent, is—

1. The arrangement of a frame, C, on the mouth A of a retort, said frame forming bearing-surfaces for the edges of the lid, substantially as set forth.

2. The lid D, provided with V-shaped edges $a\ a'$, to fit in corresponding V-shaped grooves $b$ in the rim or frame C of the retort, substantially as shown and described.

3. The combination of locking wedges or bolts E E with the lid D, the edges of which fit in a groove in the rim of the retort-mouth, substantially as set forth.

4. The arrangement of a swivel-arm, G, carrying a lever, H, which is pivoted to the lid of the retort, substantially as and for the purpose described.

This specification signed by us this 28th day of January, 1874.

I. HERZOG.
       RICHARD KOCH.

Witnesses:
 W. HAUFF,
 E. F. KASTENHUBER.